United States Patent
Okuni et al.

(10) Patent No.: US 8,831,153 B2
(45) Date of Patent: Sep. 9, 2014

(54) QUADRATURE ERROR COMPENSATING CIRCUIT

(71) Applicants: Hidenori Okuni, Yokohama (JP); Junya Matsuno, Kawasaki (JP); Hideo Kasami, Yokohama (JP); Tsuyoshi Kogawa, Kawasaki (JP)

(72) Inventors: Hidenori Okuni, Yokohama (JP); Junya Matsuno, Kawasaki (JP); Hideo Kasami, Yokohama (JP); Tsuyoshi Kogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 13/724,277

(22) Filed: Dec. 21, 2012

(65) Prior Publication Data

US 2013/0243129 A1 Sep. 19, 2013

(30) Foreign Application Priority Data

Mar. 19, 2012 (JP) ................................ 2012-062729

(51) Int. Cl.
H03D 1/00 (2006.01)
H04L 27/06 (2006.01)
H04L 27/38 (2006.01)

(52) U.S. Cl.
CPC ............ *H04L 27/38* (2013.01); *H04L 27/3863* (2013.01)
USPC ............................. 375/343; 375/340; 370/320

(58) Field of Classification Search
CPC ...................................................... H04B 1/0032
See application file for complete search history.

(56) References Cited

U.S. PATENT DOCUMENTS

| | | | |
|---|---|---|---|
| 5,014,712 A * | 5/1991 | O'Donnell | 600/447 |
| 6,377,620 B1 | 4/2002 | Ozluturk et al. | |
| 6,895,045 B2 | 5/2005 | Ozluturk et al. | |
| 7,477,687 B2 | 1/2009 | Ozluturk et al. | |
| 2009/0141788 A1 | 6/2009 | Ozluturk et al. | |
| 2010/0315169 A1* | 12/2010 | Filipovic et al. | 331/11 |
| 2014/0015690 A1* | 1/2014 | Feher | 340/870.18 |

FOREIGN PATENT DOCUMENTS

| | | |
|---|---|---|
| JP | 2004-266416 A | 9/2004 |
| JP | 2006-81045 A | 3/2006 |
| JP | 2006-094252 A | 4/2006 |
| JP | 2009-71833 A | 4/2009 |
| JP | 2010-226756 A | 10/2010 |

OTHER PUBLICATIONS

Applicant-provided Background Art Information Sheet.
Japanese Office Action dated Jul. 30, 2013 (and English translation thereof) in counterpart Japanese Application No. 2012-062729.

* cited by examiner

*Primary Examiner* — Erin File
(74) *Attorney, Agent, or Firm* — Holtz Holtz Goodman & Chick PC (57) ABSTRACT

According to one embodiment, a quadrature error compensating circuit for acquiring an in-phase component signal and a quadrature component signal, includes a first filter, a first multiplier, a first subtractor, a second filter, a correlation calculating circuit. The first multiplier multiplies the in-phase component signal by a control value. The correlation calculating circuit calculates a cross-correlation value between an output of the first filter and an output of the second filter, and uses the cross-correlation value as the control value.

20 Claims, 6 Drawing Sheets

QUADRATURE ERROR COMPENSATING CIRCUIT

CROSS-REFERENCE TO RELATED APPLICATIONS

This application is based upon and claims the benefit of priority from Japanese Patent Application No. 2012-062729, filed Mar. 19, 2012, the entire contents of which are incorporated herein by reference.

FIELD

Embodiments described herein relate to quadrature error compensating circuits for use in a receiver.

BACKGROUND

In the conventional quadrature error compensating circuits, a phase error occurring in a 90° phase shifter is detected, and a phase error is corrected based on the detection result.

Since in the conventional receivers, phase errors that occur due to variations in characteristic between the analog elements of analog baseband filters are not considered, phase errors occurring in 90° phase shifters cannot accurately be detected.

DETAILED DESCRIPTION

Quadrature error compensating circuits according to embodiments will be described in detail with reference to the accompanying drawings. In the embodiments, like reference numbers denote like elements, and no duplicate description will be made.

The embodiments have been developed in light of the above, and aim to provide a quadrature error compensating circuit capable of accurately correcting a quadrature phase error even in a frequency band with small variation in quadrature phase errors, when phase errors occur due to characteristic variation in the analog elements of analog baseband filters.

According to one embodiment, a quadrature error compensating circuit for acquiring an in-phase component signal and a quadrature component signal, includes a first filter, a first multiplier, a first subtractor, a second filter, a correlation calculating circuit. The first filter passes therethrough only a first low-band signal component of a frequency lower than a first frequency. The first low-band signal component is included in the in-phase component signal. The first multiplier multiplies the in-phase component signal by a control value. The first subtractor subtracts an output of the first multiplier from the quadrature component signal. The second filter passes therethrough only a second low-band signal component of a frequency lower than a second frequency. The second low-band signal component is included in an output of the first subtractor. The correlation calculating circuit calculates a cross-correlation value between an output of the first filter and an output of the second filter, and uses the cross-correlation value as the control value. The first frequency and the second frequency are included in a signal band of the in-phase component signal and a signal band of the quadrature component signal.

First Embodiment

Figure 1:
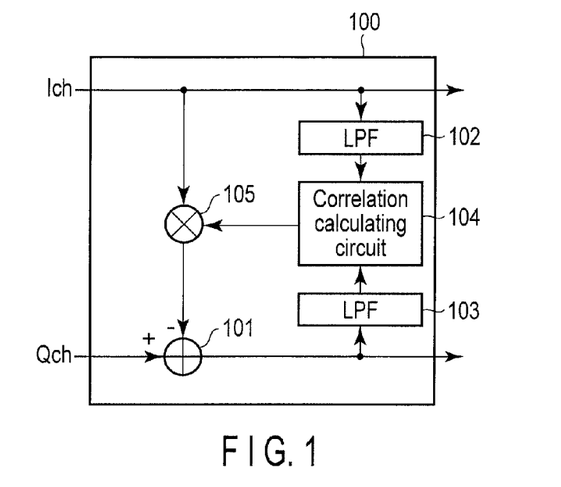
FIG. 1 is a block diagram illustrating a quadrature error compensating circuit according to a first embodiment.

Referring first to FIG. 1, a description will be given of a quadrature error compensating circuit 100 according to a first embodiment. FIG. 1 is a block diagram illustrating the quadrature error compensating circuit 100 of the first embodiment.

As shown, the quadrature error compensating circuit 100 comprises a subtractor 101, low-pass filters (LPFs) 102 and 103, a correlation calculating circuit 104 and a multiplier 105. The quadrature error compensating circuit 100 acquires an in-phase signal component (Ich) and a quadrature signal component (Qch) that are obtained by quadrature detection.

The multiplier 105 multiplies the input Ich signal by the output signal of the correlation calculating circuit 104, and inputs the resultant signal to the subtractor 101.

The subtractor 101 subtracts the output signal of the multiplier 105 from the input Qch signal, and outputs the resultant signal as a quadrature output signal obtained after the quadrature error correction.

The LPF 102 only passes therethrough a low-band signal component contained in the input Ich signal. The LPF 103 only passes therethrough a low-band signal component contained in the output signal of the subtractor 101. The cut-off frequencies of the LPFs 102 and 103 fall within the band of the Ich and Qch signals.

The correlation calculating circuit 104 calculates a cross-correlation value (also referred to as a control value) associated with the input two signals. In the case of FIG. 1, a cross-correlation value associated with the output signals of the LPFs 102 and 103. The cross-correlation value serves as an index indicating the ratio of an interference signal component in a target signal that cause the phase error of the target signal. The correlation calculating circuit 104 imparts an appropriate gain to the cross-correlation value, and inputs the resultant signal to the multiplier 105. By virtue of the feedback operations of the correlation calculating circuit 104 and the subtractor 101, control is performed so as to reduce the correlation value (to a value equivalent to non-correlation).

Figure 2:
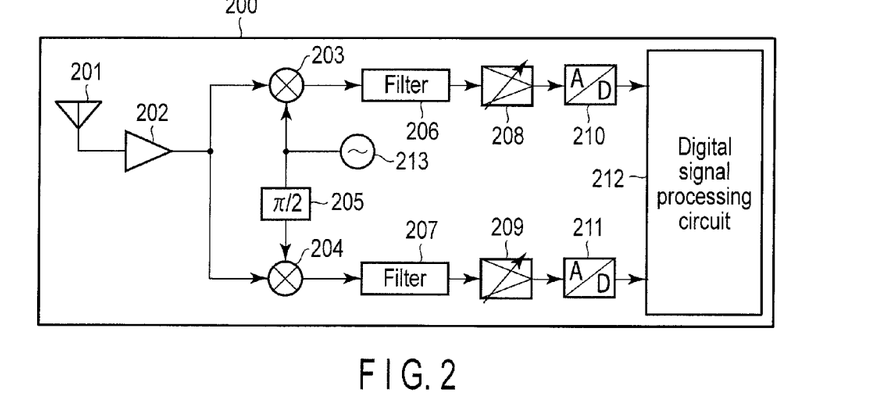
FIG. 2 is a block diagram illustrating a general direct conversion type receiver.

Referring then to FIG. 2, the operation principle of a quadrature error compensating circuit will be described, using a general direct conversion type receiver as an example.

FIG. 2 is a block diagram illustrating an example of a general direct conversion type receiver.

A general direct conversion type receiver 200 comprises an antenna 201, a low-noise amplifier (LNA) 202, mixers 203 and 204, a local oscillator 213, analog baseband filters 206 and 207, baseband amplifiers 208 and 209, AD converters 210 and 211, and a digital signal processing circuit 212.

The signal received by the antenna 201 is amplified by the LNA 202 and divided into two components. The resultant two signals are distributed to the mixers 203 and 204, where each distributed signal is mixed with a frequency signal sent from the local oscillator 213 (frequency conversion). The local oscillator 213 is directly connected to the mixer 203, and is connected to the mixer 204 via a π/2 phase shifter 205. As a result, the frequency-converted baseband signals have a phase difference of π/2. These two signals have their unnecessary frequency components (high-frequency components generated by mixing, interference signal components, DC offset components, etc.) eliminated by the analog baseband filters 206 and 207, then amplified by the baseband amplifiers 208 and 209, and subjected to analog-to-digital conversion by the AD converters 210 and 221. Using the resultant digital signals, the digital signal processing circuit 212 performs signal demodulation processing.

A description will now be given of the case where the π/2 phase shifter 205 has an advancing phase error of α because of the influence of variations in the characteristics of analog elements between π/2 phase shifters.

Assume here that the signal input to the mixers 203 and 204 is $s(t)=2I(t)\cos(2\pi f_c t)-2Q(t)\sin(2\pi f_c t)$. In this case, the input from the local oscillator 213 to the mixer 203 is $\cos(2\pi f_c t)$, and the input to from the local oscillator 213 to the mixer 204 via the π/2 phase shifter 205 is $\cos(2\pi f_c t+\pi/2+\alpha)=-\sin(2\pi f_c t+\alpha)$. The in-phase component signal I'(t) and the quadrature component signal Q'(t) of each of the mixer output signals, which have their respective in-phase components and quadrature components processed by the analog band filters 206 and 207 to eliminate high-frequency components, are given by In-phase component $I'(t)=I(t)$     (1)

Quadrature component $Q'(t)=Q(t)\cos(\alpha)+I(t)\sin(\alpha)$     (2)

Where the π/2 phase shifter 205 has a phase error, the quadrature component $I(t)\sin(\alpha)$ occurs as an unnecessary signal, and a quadrature amplitude difference corresponding to $\cos(\alpha)$ occurs, with the result that the characteristics of the entire circuit are degraded. It should be noted that the unnecessary signal $I(t)\sin(\alpha)$ as a quadrature component resulting from the phase error is correlated with the in-phase signal I(t), as is shown in the above equations (1) and (2). There is no correlation between the signal components I(t) and Q(t), while a correlation exists between the signal I(t) as the in-phase component and the unnecessary signal $I(t)\sin(\alpha)$ in the quadrature component.

A description will be given of how to eliminate the unnecessary signal, while paying attention to the above correlation. In this embodiment, the case where the in-phase component signal (I'(t)) and quadrature component signal (Q'(t)) of a certain signal having a quadrature error are input to the quadrature error compensating circuit 100 will be described. Further, since the LPFs 102 and 103 do not contribute to the elimination of the unnecessary signal $I(t)\sin(\alpha)$ in the quadrature component, a description as to how to eliminate the unnecessary signal will be given of the case where the LPFs 102 and 103 are not employed.

The correlation calculating circuit 104 imparts an appropriate gain to the correlation calculation result of I'(t) and Q'(t), and inputs the resultant signal to the amplifier 105. The amplifier 105 amplifies the in-phase component signal (I'(t)) by the output of the correlation calculating circuit 104, and outputs the resultant signal to the subtractor 101. The subtractor 101 subtracts the output of the amplifier 105 from the input quadrature component signal (Q'(t)), and outputs the resultant signal. Thus, control is performed so as to reduce the correlation value (to a value equivalent to non-correlation), utilizing the feedback function of the subtractor 101. As a result, the output of the correlation calculating circuit 104 converges to $\sin(\alpha)$, which means that the unnecessary signal of the quadrature component is eliminated, i.e., that quadrature error compensation is performed. Thus, $I(t)\sin(\alpha)$ is eliminated from the quadrature component signal (Q'(t)), thereby providing a quadrature component signal $Q'(t)=Q(t)\cos(\alpha)$. It is sufficient if $\cos(\alpha)$ is subjected to amplitude correction in a later stage (see, for example, FIG. 12).

Figure 3:
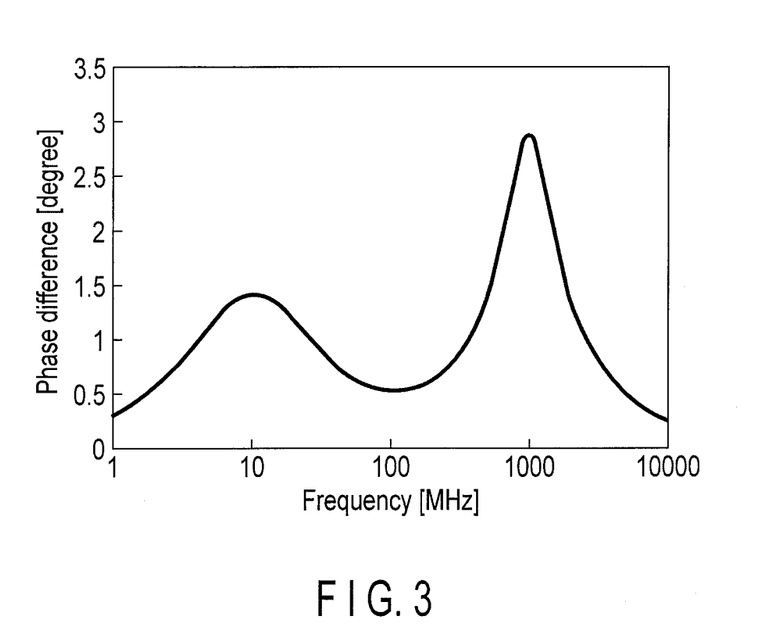
FIG. 3 is a graph illustrating phase differences due to variations in characteristics between analog elements.

However, the quadrature error can occur not only due to the phase error α, but also due to another factor. Referring to FIG. 3, this factor will be described.

In general, the analog baseband filters 206 and 207 vary in their characteristics due to variations in the characteristics of the analog elements thereof. Regarding this point, a description will be given of such an example as shown in FIG. 3. In this example, it is assumed that the analog baseband filters are band-bass filters having a third-order Butterworth LPF characteristic and a first-order Butterworth high-pass filter (HPF) characteristic. FIG. 3 shows the phase differences between the filters due to errors occurring in the LPF and HPF cutoff frequencies. In FIG. 3, the LPF cutoff frequencies of the analog baseband filters 206 and 207 are 1 GHz and 1.02 GHz, respectively, namely, an error of 2% occurs therebetween. Similarly, the HPF cutoff frequencies of the analog baseband filters 206 and 207 are 10 MHz and 10.5 MHz, respectively, namely, an error rate of 5% occurs therebetween.

The above errors in cutoff frequencies may cause quadrature phase errors. The reason why the error in the HPF cutoff frequencies is higher than the LPF cutoff frequencies lies in that the main factors of the error of the LPF cutoff frequency are variations in the characteristics of resistances and capacitors, while the main factors of the error of the HPF cutoff frequency are variations in the gain characteristics in a feedback loop, in addition to variations in the characteristics of resistances and capacitors. As shown in FIG. 3, different phase errors occur depending upon frequency, namely, great phase differences are found near the LPF and HPF cutoff frequencies.

Figure 4:
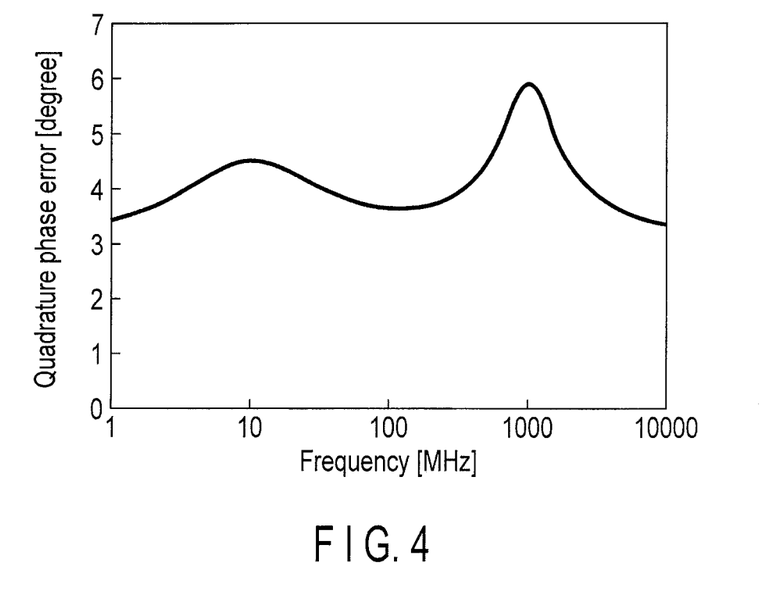
FIG. 4 is a graph illustrating a relationship between frequency and quadrature phase error in the first embodiment.

Referring then to FIG. 4, a description will be given of the relationship between frequency and quadrature phase error, which is assumed when the phase error α of the π/2 phase shifter 205 is 3 degrees, and the cutoff frequencies of the analog baseband filters vary as mentioned above. FIG. 4 shows a characteristic curve obtained when a constant (set regardless of frequency) phase error α (=3 degrees) is added to the characteristic curve of FIG. 3.

As shown in FIG. 4, even if quadrature phase errors that vary depending upon frequency are attempted to be corrected by the quadrature error compensating circuit 100 provided with neither of the LPFs 102 and 103, the phase error of the π/2 phase shifter 205 cannot be corrected because a constant quadrature phase error cannot be obtained due to the influence of the quadrature phase errors of the analog baseband filters.

Therefore, in the quadrature error compensating circuit 100 of the first embodiment, correlation is calculated before a signal is input to the correlation calculating circuit 104, and after the signal is filtered by the LPF of the aforementioned analog filters configured to pass a signal of a band of a small phase difference (in this example, a frequency band of about 100 MHz or less). As a result, the influence of the analog baseband filters is minimized, and a phase error occurring in the π/2 phase shifter 205 can be accurately corrected. Namely, by cutting the high-frequency side signals in the characteristic curve of FIG. 4, it becomes sufficient if the substantially constant quadrature error is corrected, whereby the phase error occurring in the π/2 phase shifter 205 can be accurately corrected utilizing the feedback operations of the correlation calculating circuit 104 and the subtractor 101.

In an integrated circuit comprising both analog and digital circuits, a spurious signal due to a clock signal in the digital circuit (i.e., an unnecessary wave of a frequency several times the frequency of the operation clock) may occur in the analog circuit. To suppress the influence of such a spurious signal, the spurious signal is filtered by the LPF, and then correlation is calculated. Thus, the influence of the spurious signal is further reduced to enable the phase error occurring in the π/2 phase shifter 205 to be accurately corrected.

(First Modification)

Figure 5:
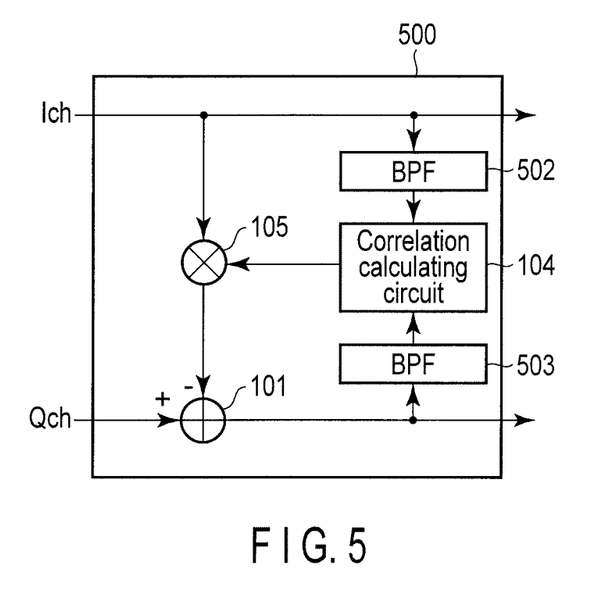
FIG. 5 is a block diagram illustrating a quadrature error compensating circuit according to a first modification of the first embodiment.

Referring to FIG. 5, a first modification of the quadrature error compensating circuit 100 of the first embodiment will be described. FIG. 5 is a block diagram illustrating a quadrature error compensating circuit 500 according to the first modification. The quadrature error compensating circuit 500 differs from the quadrature error compensating circuit 100 only in that the former employs band-pass filters (BPFs) 502 and 503 instead of the LPFs 102 and 103 in the latter.

The BPS 502 only passes therethrough the signal component of the input Ich signal that excludes the low- and high-band signal components thereof. The BPS 503 only passes therethrough the signal component of the output of the subtractor 101 that excludes the low- and high-band signal components thereof. The BPFs 502 and 503 may be formed of finite impulse response (FIR) filters or infinite impulse response filters (IIR).

In this case, the correlation calculating circuit 104 calculates a cross-correlation value between the outputs of the BPFs 502 and 503. In the first modification, the BPFs 502 and 503 are used to eliminate frequency bands in which great quadrature phase errors exist due to the analog baseband filters 206 and 207, thereby correcting quadrature phase errors in frequency bands in which the quadrature phase errors do not greatly vary. Since thus, the quadrature phase error compensating circuit 500 also eliminates the low-frequency bands that are not eliminated by the quadrature error compensating circuit 100, it can correct the frequency bands of smaller quadrature phase errors than the quadrature error compensating circuit 100. Namely, the quadrature error compensating circuit 500 can exhibit a higher quadrature phase error correction accuracy than the quadrature error compensating circuit 100.

(Second Modification)

Figure 6:
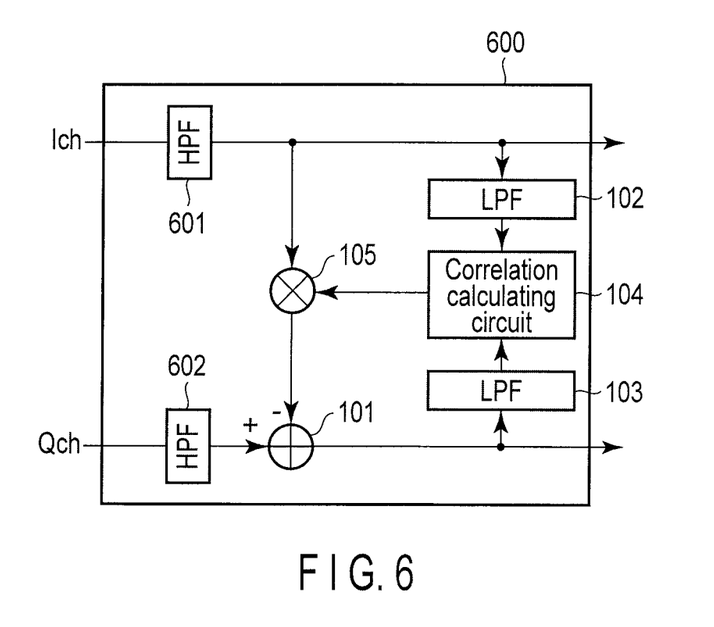
FIG. 6 is a block diagram illustrating a quadrature error compensating circuit according to a second modification of the first embodiment.

Referring to FIG. 6, a second modification of the quadrature error compensating circuit 100 of the first embodiment will be described. FIG. 6 is a block diagram illustrating a quadrature error compensating circuit 600 according to the second modification. The quadrature error compensating circuit 600 differs from the quadrature error compensating circuit 100 in that the former employs HPFs 601 and 602 before the multiplier 105 and the subtractor 101, respectively, in addition to the elements incorporated in the quadrature error compensating circuit 100.

The HPF 601 passes therethrough only the high-frequency signal component of the input Ich signal, and inputs the resultant signal to the multiplier 105 and the LPF 102.

The HPF 602 passes therethrough only the high-frequency signal component of the input Qch signal, and inputs the resultant signal to the subtractor 101.

At this time, the correlation calculating circuit 104 calculates a cross-correlation value between the signal passing through the HPF 601 and LPF 102 and the signal passing through the HPF 602 and the LPF 103, thereby providing the same advantage as the first modification. Namely, in the second modification, the frequency band, in which a large quadrature phase error will occur due to the analog baseband filters 206 and 207, is eliminated using the combination of the HPF 601 and the LPF 102 and the combination of HPF 602 and the LPF 103, thereby correcting quadrature phase errors in a frequency band in which variations in quadrature phase error is small. Since thus, even a low-frequency band, which is not eliminated by the quadrature error compensating circuit 100, is also eliminated, correction can be performed on the frequency band with smaller variation in quadrature phase error. As a result, the accuracy of correction of quadrature phase errors in the quadrature error compensating circuit 600 is higher than that in the quadrature error compensating circuit 100.

Figure 7:
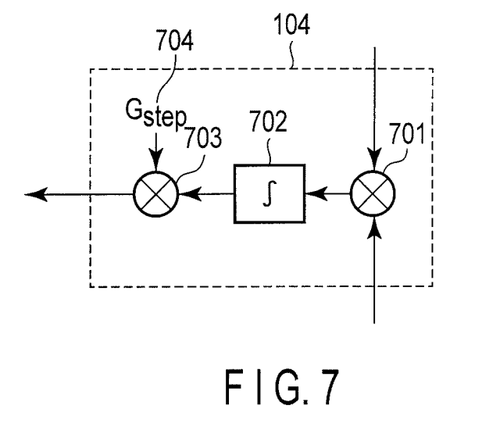
FIG. 7 is a circuit diagram illustrating a correlation calculating circuit example.
Figure 8:
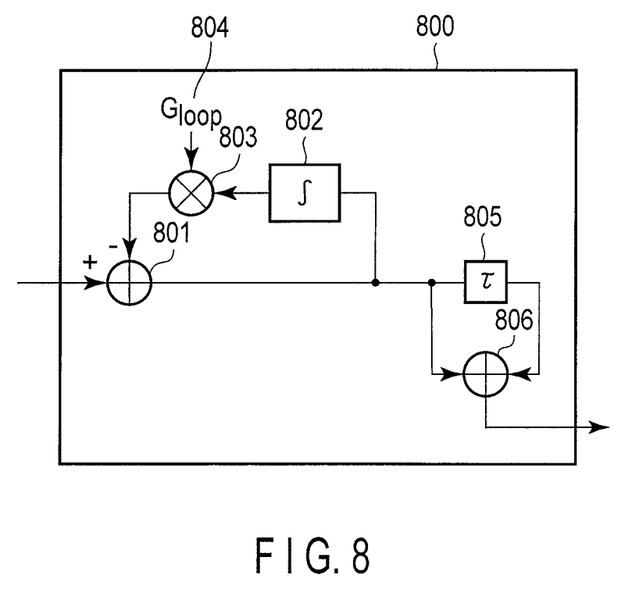
FIG. 8 is a circuit diagram illustrating a band-pass filter (BPF) example.

Referring to FIGS. 7 and 8, descriptions will be given of the correlation calculating circuit 104, the BPFs 502 and 503, the LPFs 102 and 103, and the HPFs 601 and 602. FIG. 7 is a circuit diagram illustrating a circuit structure example of the correlation calculating circuit 104. FIG. 8 is a circuit diagram illustrating an example of a BPF (i.e., a BPF 800). FIGS. 7 and 8 show that examples of LPF and HPF are incorporated in the structures.

The correlation calculating circuit 104 comprises multipliers 701 and 703, and an integrator 702. The multiplier 701 multiplies two input signals together, and the integrator 702 integrates the output of the multiplier 701. In the correlation calculating circuit 104, the multiplier 703 multiplies the output of the integrator 702 by an appropriate gain $G_{step}$ 704, and outputs the resultant signal. The two inputs to multiplier 701 are the signals passing through the LPFs 102 and 103 in the examples of FIGS. 1 and 6, and are the signals passing through the BPFs 502 and 503 in the example of FIG. 5.

The BPF 800 comprises a subtractor 801, an integrator 802, a multiplier 803, a delay circuit 805, and an adder 806.

The input signal of the BPF 800 and the output of the multiplier 803 are sent to the subtractor 801. The output of the subtractor 801 is integrated by the integrator 802. The output of the subtractor 801 is integrated by the integrator 802, then multiplied by a control coefficient $G_{loop}$ 804 in the multiplier 803, and output to the subtractor 801. Further, the output of the subtractor 801 is input to the adder 806. The delay circuit 805 applies a predetermined delay to the signal input thereto, and outputs the resultant signal. The adder 806 adds up the output of the delay circuit 805 and the output of the subtractor 801, and outputs the resultant signal.

The operation principle of the band-pass filter will now be described. The output of the subtractor 801 is fed back thereto via the integrator 802 and the multiplier 803, which are included in a high pass filter (HPF). The cutoff frequency of the HPF is determined from the loop gain $G_{loop}$. Further, the output of the subtractor 801, and the output of the delay circuit 805, which is obtained by adding the predetermined delay, are added by the adder 806. This circuit includes a low-pass filter (LPF). The cutoff frequency of the LPF is determined from the delay of the delay circuit 805. It is sufficient if those cutoff frequencies are set to values falling within the respective bands of the aforementioned analog baseband filters.

In the above described embodiment and modifications, the analog baseband filters 206 and 207 are band-pass filters. However, if the analog baseband filters are low-pass filters, it is sufficient if band-pass filters are employed instead of the LPFs 102 and 103.

Further, even if the in-phase component (Ich) and the quadrature component (Qch) as the input signals of the quadrature error compensating circuit are exchanged, the above-mentioned advantage can be obtained. The same can be said of the quadrature error compensating circuits according to all embodiments described below.

In the above described embodiment and modifications, the quadrature error compensating circuit 100, 500 or 600 is provided after the analog baseband filters 206 and 207. The quadrature error compensating circuit 100, 500 or 600 acquires, for example, the component Ich from between the AD converter 210 and the digital signal processing circuit 212, and the component Qch from between the AD converter 211 and the digital signal processing circuit 212. Alternatively, the component Ich may be acquired from between the AD converter 210 and the digital signal processing circuit 212, and the component Qch be acquired from between the AD converter 211 and the digital signal processing circuit 212. Yet alternatively, the component Ich may be acquired from between the analog baseband filter 206 and a baseband amplifier 208, and the component Qch be acquired from between the analog baseband filter 207 and a baseband amplifier 209. The same can be said of the quadrature error compensating circuits according to the other embodiments described below.

Alternatively, the quadrature error compensating circuit 100, 500 or 600 may acquire the components Ich and Qch from a stage before the analog baseband filters 206 and 207, namely, may acquire the component Ich from between the mixer 203 and the analog baseband filter 206, and the component Qch from between the mixer 204 and the analog baseband filter 207. Also in this case, correction accuracy is improved compared to the prior art. The same can be said of the quadrature error compensating circuits according to the other embodiments described below.

According to the above-described first embodiment, even when a phase error occurs due to characteristic variations in analog elements between analog baseband filters, correction can be performed on a frequency band with small variation in quadrature phase error, thereby achieving a higher correction accuracy.

Second Embodiment

Figure 9:
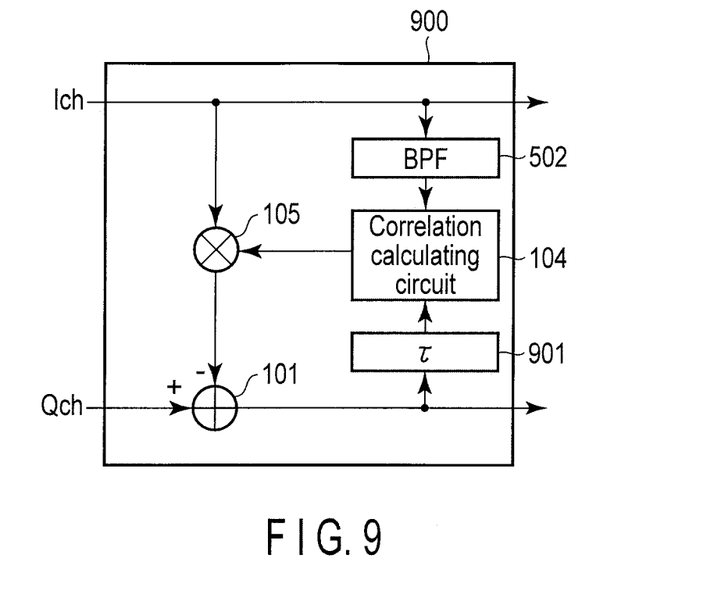
FIG. 9 is a block diagram illustrating a quadrature error compensating circuit according to a second embodiment.

A quadrature error compensating circuit 900 according to a second embodiment differs from the first embodiment only in that in the former, one of the BPFs included in the quadrature error compensating circuit 500 is replaced with a delay circuit.

Referring to FIG. 9, the quadrature error compensating circuit 900 of the second embodiment will be described.

The quadrature error compensating circuit 900 is obtained by replacing the BPF 503 of the quadrature error compensating circuit 500 with a delay circuit 901. The other structure of the circuit 900 is similar to that of the circuit 500.

The delay circuit 901 delays the output signal of the subtractor 101 by the group delay of the BPF 502.

The correlation calculating circuit 104 of FIG. 9 calculates a cross-correlation value between the output of the BPF 502 and the output of the delay circuit 901. The correlation value serves as an index indicating the mixture ratio of an interference signal that causes the phase error of a target signal. The correlation calculating circuit 104 imparts an appropriate gain to the correlation value and inputs the resultant value to the multiplier 105. The feedback operation of the correlation calculating circuit 104 and the subtractor 101 enables control for reducing the correlation value (to a value equivalent to non-correlation).

The operation principle of the quadrature error compensating circuit 900 will be described.

An Ich signal is filtered by the BPF 502 having its cutoff frequency set within the bands of the analog baseband filters 206 and 207, thereby extracting a signal component that is not greatly influenced by a quadrature phase error due to the analog baseband filters. Further, the delay circuit 901 adds, to the output of the subtractor 101, a group delay that occurs in the BPF 502, and inputs the resultant signal to the correlation calculating circuit 104. Since the input to the circuit 104 is filtered by the BPF 502, correlation is found only in the filtered signal band, with the result that control is performed on the band, filtered by the BPF 502, utilizing the feedback operation of the correlation calculating circuit 104 and the subtractor 101, so that the degree of correlation is reduced, whereby the band filtered by the BPF 502 is subjected to quadrature phase error compensation. In the second embodiment, since one BPF can be formed of one delay circuit, the circuit scale can be reduced.

The above-described second embodiment provides an advantage that the circuit scale can be reduced, as well as an advantage similar to that of the first embodiment.

Although the above-described second embodiment is obtained by replacing the BPF 503 of the quadrature error compensating circuit 500 with the delay circuit 901, it can be obtained by replacing the LPF 103 of the quadrature error compensating circuit 100 with the delay circuit 901, or by replacing the LPF 103 of the quadrature error compensating circuit 600 with the delay circuit 901. In any case, the same advantages as the above can be obtained. Furthermore, the delay circuit 901 may be provided on the Ich side, i.e., close to the BPF 502 and the LPF 102. In this case, the BPF 503 and the LPF 103 are provided on the Qch side. Also in this case, the same advantages as the above can be obtained. These changes may be made in all embodiments described below. In any case, the same advantages can be obtained.

Third Embodiment

Figure 10:
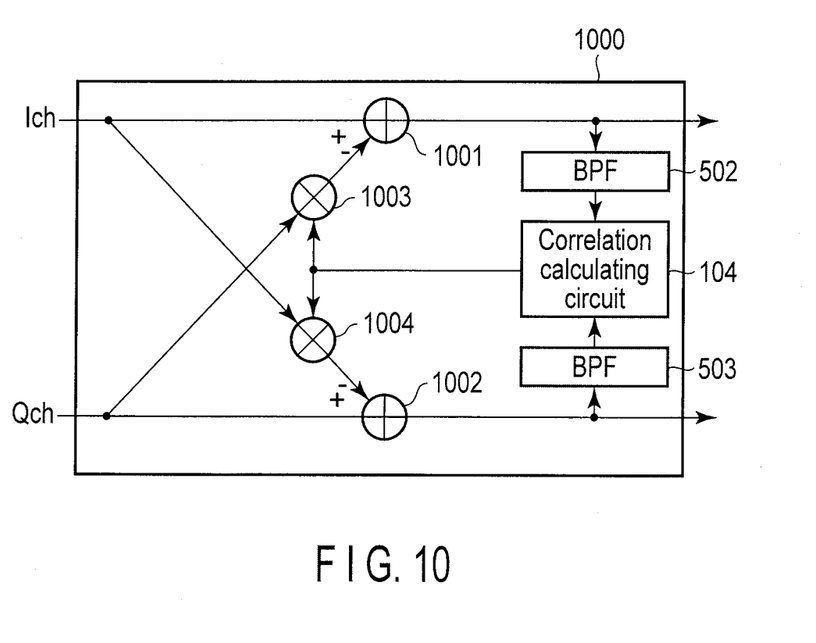
FIG. 10 is a block diagram illustrating a quadrature error compensating circuit according to a third embodiment.

A quadrature error compensating circuit 1000 according to a third embodiment differs from the first modification of the first embodiment in that the former employs two combinations of subtractors and multipliers similar to the combination of the subtractor and the multiplier in the quadrature error compensating circuit 500, such that the respective combinations are provided on the Ich side and the Qch side.

Referring to FIG. 10, the quadrature error compensating circuit 1000 of the third embodiment will be described. The quadrature error compensating circuit 1000 comprises subtractors 1001 and 1002, multipliers 1003 and 1004, BPFs 502 and 503, and a correlation calculating circuit 104. The quadrature error compensating circuit 1000 acquires the in-phase component (Ich) signal and the quadrature component (Qch) signal that result from quadrature detection.

The subtractor 1001 subtracts the output of the multiplier 1003 from the input Ich signal, and outputs the resultant signal as an in-phase output signal obtained after quadrature error correction.

The subtractor 1002 subtracts the output of the multiplier 1004 from the input Qch signal, and outputs the resultant signal as a quadrature output signal obtained after quadrature error correction.

The BPF 502 shown in FIG. 10 eliminates low-band and high-band components from the output of the subtractor 1001. The BPF 503 shown in FIG. 10 eliminates low-band and high-band components from the output of the subtractor 1002.

The correlation calculating circuit 104 shown in FIG. 10 calculates a cross-correlation value between the output signals of the BPFs 502 and 503. The cross-correlation value serves as an index indicating the mixture ratio of an interference signal that causes the phase error of a target signal. The correlation calculating circuit 104 imparts an appropriate gain to the cross-correlation value, and inputs the resultant signal to the multipliers 1003 and 1004. By virtue of the feedback operations of the correlation calculating circuit 104 and the subtractors 1001 and 1002, control is performed so as to reduce the correlation value (to a value equivalent to non-correlation).

The operation principle of the quadrature error compensating circuit 1000 will be described.

In the first embodiment, the in-phase component and the quadrature component of a received signal, assumed when the $\pi/2$ phase shifter 205 has an advancing phase error of $\alpha$ from $\pi/2$, are modeled using equations (1) and (2). Since the phase difference is the relative difference between the in-phase component and the quadrature component, the signal from the local oscillator 213 to the mixer 203 may be modeled as $\cos(2\pi f_c t - \alpha/2)$, and the signal from the local oscillator 213 to the mixer 204 may be modeled as $\cos(2\pi f_c t + \pi/2 + \alpha/2)(= -\sin(2\pi f_c t + \alpha/2))$. In the third embodiment, since the circuit is made symmetrical between the Ich side and the Qch side, the above model is employed. The signals, obtained by eliminating high-frequency components from the in-phase component and the quadrature component of each of the mixer output signals using the analog band filters 206 and 207, are given by $$\text{In-phase component } I''(t)=I(t)\cos(\alpha/2)+Q(t)\sin(\alpha/2) \tag{3}$$

$$\text{Quadrature component } Q''(t)=Q(t)\cos(\alpha/2)+I(t)\sin(\alpha/2) \tag{4}$$

Since thus, $Q(t)\sin(\alpha/2)$ and $I(t)\sin(\alpha/2)$ occur as unnecessary signals in the in-phase component and the quadrature component, respectively, characteristics will be degraded. The respective first terms of the above equations (3) and (4) are desired signals, and the respective second terms of them are unnecessary signals. The unnecessary signal in the in-phase component is correlated with the desired signal of the quadrature component, and the unnecessary signal in the quadrature component is correlated with the desired signal of the in-phase component.

The correlation calculating circuit 104 of FIG. 10 imparts, an appropriate gain to the correlation value between I''(t) and Q''(t), and outputs the resultant signals to the multipliers 1003 and 1004. The multiplier 1004 multiplies the in-phase component signal (I''(t)) and the output of the correlation calculating circuit 104 together, and outputs the resultant signal to the subtractor 1002. The subtractor 1002 subtracts the output of the multiplier 1004 from the input quadrature component signal (Q''(t)), and outputs the resultant signal. The multiplier 1003 multiplies the quadrature component signal (Q''(t)) and the output of the correlation calculating circuit 104 together, and outputs the resultant signal to the subtractor 1001. The subtractor 1001 subtracts the output of the multiplier 1003 from the input in-phase component signal (I''(t)), and outputs the resultant signal. Namely, since in the third embodiment, control is performed so as to reduce the correlation value (to a value equivalent to non-correlation), using the feedback operation of the correlation calculating circuit 104 and the subtracters 1001 and 1002, the output of the correlation calculating circuit 104 is converged to $\sin(\alpha/2)$ without the quadrature component as the unnecessary component, thereby achieving quadrature phase error compensation. The signal resulting from the phase compensation is given by $$\text{In-phase component } I'''(t)=I(t)\cos(\alpha/2) \tag{5}$$

$$\text{Quadrature component } Q'''(t)=Q(t)\cos(\alpha/2) \tag{6}$$

In the third embodiment, it is not necessary to perform amplitude correction after phase error compensation, since no quadrature amplitude error occurs unlike the first embodiment.

The above-described third embodiment can provide the same advantages as the first embodiment, and can dispense with amplitude correction after the phase error compensation.

Fourth Embodiment

Figure 11:
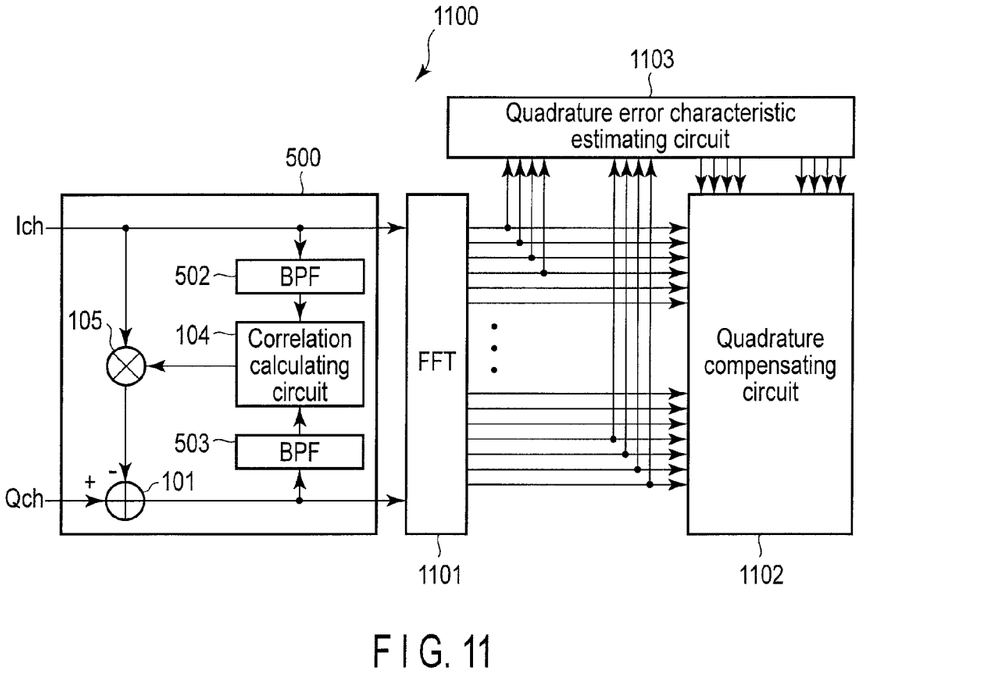
FIG. 11 is a block diagram illustrating a quadrature error compensating circuit according to a fourth embodiment.

A quadrature error compensating circuit 1100 according to a fourth embodiment differs from the quadrature error compensating circuit 500 of the first modification of the first embodiment in that in the former, an FFT calculator 1101, a quadrature error compensating circuit 1102 and a quadrature error characteristic estimating circuit 1103 are added.

Referring to FIG. 11, a description will be given of the quadrature error compensating circuit 1100 of the fourth embodiment. FIG. 11 is a block diagram illustrating the quadrature error compensating circuit 1100 of the fourth embodiment.

As mentioned above, the quadrature error compensating circuit 1100 comprises the quadrature error compensating circuit 500, the FFT calculator 1101, the quadrature error compensating circuit 1102 and the quadrature error characteristic estimating circuit 1103. Since the phase error occurring in the $\pi/2$ phase shifter 205 is corrected as aforementioned, it is sufficient if the quadrature error compensating circuit 500 corrects only quadrature errors in the frequency bands near the cutoff frequencies of the analog baseband filters 206 and 207.

The FFT computing unit 1101 performs fast Fourier transform (FFT) on the output of the quadrature compensating circuit 500 to convert a time-domain signal onto a frequency-domain signal.

The quadrature error characteristic estimating circuit 1103 estimates the quadrature error characteristic of the frequency band near the cutoff frequencies of the analog baseband filters 206 and 207. Quadrature error characteristic estimation can be performed utilizing a known signal, such as a preamble signal or a pilot signal.

The quadrature error compensating circuit 1102 acquires the quadrature error information from the quadrature error characteristic estimating circuit 1103, and performs, based on the acquired quadrature error information, compensation for eliminating the influence of a quadrature error in the frequency band near the cutoff frequencies of the analog baseband filters. The quadrature error compensating circuit 1102 corrects phase errors in the respective frequency bands of the signal output from the FFT computing unit 1101. Thus, it is sufficient if only a phase error in the frequency band near the cutoff frequencies of the analog baseband filters is corrected. As a result, the amount of calculations can be reduced, compared to the case where correction is performed over the entire frequencies handled by the analog baseband filters.

In the above-described fourth embodiment, since the influence of a quadrature error in the frequency band near the cutoff frequencies of the analog baseband filters can be eliminated, a higher correction accuracy than in the first embodiment can be realized.

Fifth Embodiment

Figure 12:
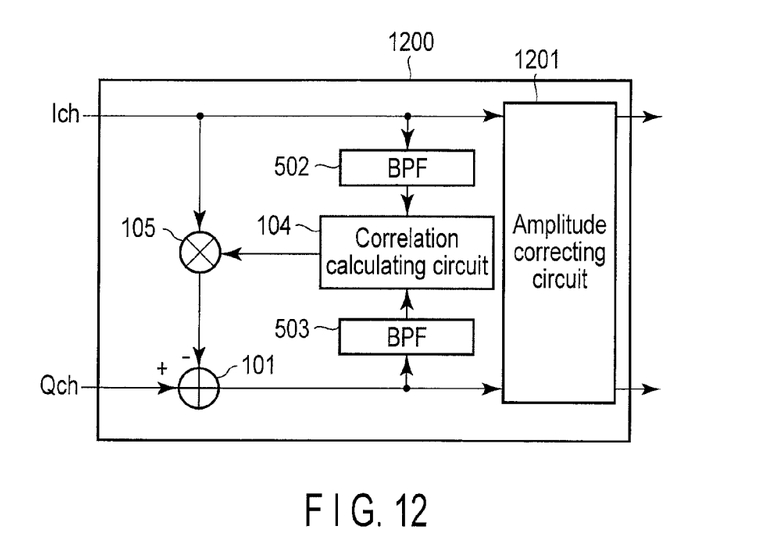
FIG. 12 is a block diagram illustrating a quadrature error compensating circuit according to a fifth embodiment.

A quadrature error compensating circuit 1200 according to a fifth embodiment differs from the first modification of the first embodiment in that in the former, an amplitude error correcting circuit 1201 is added as the last processing stage of the quadrature error compensating circuit 500.

Referring to FIG. 12, the quadrature error compensating circuit 1200 of the fifth embodiment will be described. FIG. 12 is a block diagram illustrating the quadrature error compensating circuit of the fifth embodiment.

The amplitude error correcting circuit 1201 detects, corrects and outputs a quadrature amplitude error caused by a quadrature phase error. More specifically, referring to the above equations (1) and (2), since a quadrature amplitude error corresponding to $\cos(\alpha)$ occurs between the in-phase component signal $I'(t)=I(t)$ and the quadrature component signal $Q'(t)=Q(t)\cos(\alpha)$ after the unnecessary signal $I(t)\sin(\alpha)$ in the quadrature component occurring due to the phase error is eliminated, the amplitude error correcting circuit 1201 performs quadrature amplitude error correction so that $|I'(t)/Q'(t)|=|I(t)/Q(t)|$ is satisfied.

Since in the above-described fifth embodiment, not only a quadrature phase error but also a quadrature amplitude error are corrected, a higher correction accuracy than in the first embodiment can be obtained.

In the above-described embodiments and modifications, even when phase errors are caused by characteristic variation between the analog elements of the analog baseband filters, those in frequency bands with small variation in quadrature phase errors can also be corrected, thereby achieving a higher correction accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quadrature error compensating circuit for acquiring an in-phase component signal and a quadrature component signal, the circuit comprising:
a first filter configured to pass therethrough only a first low-band signal component of a frequency lower than a first frequency, wherein the first low-band signal component is included in the in-phase component signal;
a first multiplier configured to multiply the in-phase component signal by a control value;
a first subtractor configured to subtract an output of the first multiplier from the quadrature component signal;
a second filter configured to pass therethrough only a second low-band signal component of a frequency lower than a second frequency, wherein the second low-band signal component is included in an output of the first subtractor; and
a correlation calculating circuit configured to calculate, as the control value, a cross-correlation value between an output of the first filter and an output of the second filter;
wherein the first frequency is included in a signal band of the in-phase component signal and the second frequency is included in a signal band of the quadrature component signal; and
wherein the correlation calculating circuit comprises a first correlation calculation multiplier configured to multiply the output of the first filter by the output of the second filter, and an integrator configured to integrate an output of the first correlation calculation multiplier.

2. The circuit according to claim 1, further comprising:
a Fourier transform circuit configured to Fourier transform the in-phase component signal and the output of the first subtractor in a time domain into signals in a frequency domain; and
a frequency-region quadrature compensating circuit configured to estimate a quadrature error in a portion of a frequency-band output of the Fourier transform circuit, and to correct the quadrature error.

3. The circuit according to claim 1, further comprising an amplitude correcting circuit configured to acquire the in-phase component signal and the output of the first subtractor, and to detect and correct an amplitude error in the acquired signal and the acquired output.

4. The circuit according to claim 1, further comprising:
a second multiplier configured to multiply the quadrature component signal by the control value; and
a second subtractor configured to subtract an output of the second multiplier from the in-phase component signal,
wherein the first filter passes therethrough only the first low-band signal component of the frequency lower than the first frequency, and wherein the first low-band signal component is included in an output of the second subtractor.

5. The circuit according to claim 4, further comprising:
a Fourier transform circuit configured to Fourier transform the output of the first subtractor and the output of the second subtractor in a time domain into signals in a frequency domain; and
a frequency-region quadrature compensating circuit configured to estimate a quadrature error in a portion of a frequency-band output of the Fourier transform circuit, and to correct the quadrature error.

6. The circuit according to claim 4, further comprising an amplitude correction circuit configured to acquire the output of the first subtractor and the output of the second subtractor, and to detect and correct an amplitude error in the output of the first subtractor and the output of the second subtractor.

7. A quadrature error compensating circuit for acquiring an in-phase component signal and a quadrature component signal, the circuit comprising:
a first circuit configured to acquire the in-phase component signal;
a first multiplier configured to multiply the in-phase component signal by a control value;
a first subtractor configured to subtract an output of the first multiplier from the quadrature component signal;
a second circuit configured to acquire an output of the first subtractor; and a correlation calculating circuit configured to calculate, as the control value, a cross-correlation value between an output of the first circuit and an output of the second circuit;

wherein one of the first circuit and the second circuit is a filter configured to pass therethrough a low-band signal component of a frequency lower than a given frequency, and the other of the first circuit and the second circuit is a delay circuit configured to delay an output of a signal by a delay time corresponding to a group delay of the filter; and wherein the correlation calculating circuit comprises a first correlation calculation multiplier configured to multiply the output of the first circuit by the output of the second circuit, and an integrator configured to integrate an output of the first correlation calculation multiplier.

8. The circuit according to claim 7, further comprising:
a Fourier transform circuit configured to Fourier transform the in-phase component signal and the output of the first subtractor in a time domain into signals in a frequency domain; and
a frequency-region quadrature compensating circuit configured to estimate a quadrature error in a portion of a frequency-band output of the Fourier transform circuit, and to correct the quadrature error.

9. The circuit according to claim 7, further comprising an amplitude correcting circuit configured to acquire the in-phase component signal and the output of the first subtractor, and to detect and correct an amplitude error in the acquired signal and the acquired output.

10. The circuit according to claim 7, further comprising:
a second multiplier configured to multiply the quadrature component signal by the control value; and
a second subtractor configured to subtract an output of the second multiplier from the in-phase component signal,
wherein the filter passes therethrough only the low-band signal component of the frequency lower than said given frequency, and wherein the low-band signal component is included in an output of the second subtractor.

11. The circuit according to claim 10, further comprising:
a Fourier transform circuit configured to Fourier transform the output of the first subtractor and the output of the second subtractor in a time domain into signals in a frequency domain; and
a frequency-region quadrature compensating circuit configured to estimate a quadrature error in a portion of a frequency-band output of the Fourier transform circuit, and to correct the quadrature error.

12. The circuit according to claim 10, further comprising an amplitude correction circuit configured to acquire the output of the first subtractor and the output of the second subtractor, and to detect and correct an amplitude error in the output of the first subtractor and the output of the second subtractor.

13. The circuit according to claim 1, wherein the correlation calculating circuit further comprises a second correlation calculation multiplier configured to multiply an output of the integrator by an appropriate gain and to output a resultant signal as the control value.

14. The circuit according to claim 7, wherein the correlation calculating circuit further comprises a second correlation calculation multiplier configured to multiply an output of the integrator by an appropriate gain and to output a resultant signal as the control value.

15. A quadrature error compensating circuit for acquiring an in-phase component signal and a quadrature component signal, the circuit comprising:

a first filter configured to pass therethrough only a first low-band signal component of a frequency lower than a first frequency, wherein the first low-band signal component is included in the in-phase component signal;
a first multiplier configured to multiply the in-phase component signal by a control value;
a first subtractor configured to subtract an output of the first multiplier from the quadrature component signal;
a second filter configured to pass therethrough only a second low-band signal component of a frequency lower than a second frequency, wherein the second low-band signal component is included in an output of the first subtractor;
a correlation calculating circuit configured to calculate, as the control value, a cross-correlation value between an output of the first filter and an output of the second filter;
a second multiplier configured to multiply the quadrature component signal by the control value; and
a second subtractor configured to subtract an output of the second multiplier from the in-phase component signal;
wherein the first frequency is included in a signal band of the in-phase component signal and the second frequency is included in a signal band of the quadrature component signal; and
wherein the first filter passes therethrough only the first low-band signal component of the frequency lower than the first frequency, wherein the first low-band signal component is included in an output of the second subtractor.

16. The circuit according to claim 15, further comprising:
a Fourier transform circuit configured to Fourier transform the output of the first subtractor and the output of the second subtractor in a time domain into signals in a frequency domain; and
a frequency-region quadrature compensating circuit configured to estimate a quadrature error in a portion of a frequency-band output of the Fourier transform circuit, and to correct the quadrature error.

17. The circuit according to claim 15, further comprising an amplitude correction circuit configured to acquire the output of the first subtractor and the output of the second subtractor, and to detect and correct an amplitude error in the output of the first subtractor and the output of the second subtractor.

18. A quadrature error compensating circuit for acquiring an in-phase component signal and a quadrature component signal, the circuit comprising:
a first circuit configured to acquire the in-phase component signal;
a first multiplier configured to multiply the in-phase component signal by a control value;
a first subtractor configured to subtract an output of the first multiplier from the quadrature component signal;
a second circuit configured to acquire an output of the first subtractor;
a correlation calculating circuit configured to calculate, as the control value, a cross-correlation value between an output of the first circuit and an output of the second circuit;
a second multiplier configured to multiply the quadrature component signal by the control value; and
a second subtractor configured to subtract an output of the second multiplier from the in-phase component signal;
wherein one of the first circuit and the second circuit is a filter configured to pass therethrough a low-band signal component of a frequency lower than a given frequency, and the other of the first circuit and the second circuit is a delay circuit configured to delay an output of a signal by a delay time corresponding to a group delay of the filter; and wherein the filter passes therethrough only the low-band signal component of the frequency lower than said given frequency, wherein the low-band signal component is included in an output of the second subtractor.

19. The circuit according to claim 18, further comprising:
a Fourier transform circuit configured to Fourier transform the output of the first subtractor and the output of the second subtractor in a time domain into signals in a frequency domain; and
a frequency-region quadrature compensating circuit configured to estimate a quadrature error in a portion of a frequency-band output of the Fourier transform circuit, and to correct the quadrature error.

20. The circuit according to claim 18, further comprising an amplitude correction circuit configured to acquire the output of the first subtractor and the output of the second subtractor, and to detect and correct an amplitude error in the output of the first subtractor and the output of the second subtractor.

* * * * *